United States Patent
Sung et al.

(10) Patent No.: US 8,327,731 B2
(45) Date of Patent: Dec. 11, 2012

(54) RACK BAR SUPPORTING DEVICE OF STEERING APPARATUS FOR VEHICLE

(75) Inventors: Kee-woong Sung, Wonju (KR); Kwang-ho Yang, Seoul (KR)

(73) Assignee: Mando Corporation, Gyeonggi-Do (KR)

( * ) Notice: Subject to any disclaimer, the term of this patent is extended or adjusted under 35 U.S.C. 154(b) by 373 days.

(21) Appl. No.: 12/617,087

(22) Filed: Nov. 12, 2009

(65) Prior Publication Data

US 2010/0122595 A1    May 20, 2010

(30) Foreign Application Priority Data

Nov. 18, 2008    (KR) .......................... 10-2008-0114582

(51) Int. Cl.
*F16H 55/28* (2006.01)

(52) U.S. Cl. .......................... 74/422; 74/409; 74/388 PS

(58) Field of Classification Search ............... 74/388 PS, 74/409, 422
See application file for complete search history.

(56) References Cited

U.S. PATENT DOCUMENTS

| | | | | |
|---|---|---|---|---|
| 4,619,155 | A * | 10/1986 | Futaba | 74/498 |
| 4,788,878 | A * | 12/1988 | Morita et al. | 74/422 |
| 7,487,984 | B1 * | 2/2009 | Lemont et al. | 280/93.514 |
| 2007/0209463 | A1 * | 9/2007 | Song et al. | 74/388 PS |

* cited by examiner

*Primary Examiner* — William C Joyce
*Assistant Examiner* — Terence Boes
(74) *Attorney, Agent, or Firm* — McDermott Will & Emery LLP

(57) ABSTRACT

Disclosed is a rack bar supporting device of a steering apparatus for a vehicle which can prevent rattle noise generated due to clearance increase caused by the wearing of a rack bar and a support yoke in an endurance driving of a vehicle and maintain a uniform clearance between the rack bar and the support yoke after an endurance driving, thereby transferring stable steering force.

19 Claims, 6 Drawing Sheets

RACK BAR SUPPORTING DEVICE OF STEERING APPARATUS FOR VEHICLE

CROSS-REFERENCE TO RELATED APPLICATION

This application claims priority to Korean Patent Application No. 10-2008-0114582 filed Nov. 18, 2008, which is hereby incorporated by reference in its entirety.

TECHNICAL FIELD

The present invention relates to a steering apparatus for a vehicle. More particularly, the present invention relates to a rack bar supporting device and a steering apparatus for a vehicle using the rack bar supporting device which can prevent rattle noise generated due to clearance increase caused by the wearing of a rack bar and a support yoke in an endurance driving of a vehicle and maintain a uniform clearance between the rack bar and the support yoke after an endurance driving in a rack bar supporting device of a rack pinion type steering apparatus for a vehicle, thereby transferring stable steering force.

BACKGROUND ART

In general, a steering apparatus is an apparatus through which a driver can freely change a driving direction of a vehicle and also an apparatus supporting the optional change of a rotation center about which a front wheel of a vehicle turns to drive vehicle in a desired direction of a driver.

The steering power generated by the operation of a steering wheel by a driver in the steering apparatus of a vehicle is transferred to a rack pinion mechanism through a steering shaft and finally changes the direction of both wheels.

FIG. 1 is a diagram schematically illustrating a general rack pinion-type steering apparatus for a vehicle.

As shown in FIG. 1, the conventional rack pinion-type steering apparatus includes a steering wheel 100 positioned in a driver's seat, a steering shaft 105 connected to the steering wheel 100, a steering column 103 for fixing the steering shaft to a vehicle body, a gear box 103 including a rack gear 110 and a pinion gear 120 for converting rotation force received from the steering shaft 105 into a linear movement, a rack bar 140 including an inner ball joint 135 at both ends, and a tie rod 150 integrally formed with the inner ball joint 135.

Further, the tie rod 150 is connected with an outer ball joint 155, transfers power to a knuckle 159, and steers a tire 158.

FIG. 2 is a cross-sectional view illustrating a conventional rack bar supporting device.

As shown in FIG. 2, the conventional rack bar supporting device includes a pinion gear 120, a rack bar 140, a support yoke 260, a spring 263, and a yoke plug 265. A rack pinion-type gear box 130 converts rotation force received from a steering shaft (not shown) into a linear movement as described above.

The rack bar 140 is meshed with the pinion gear 120 to convert the rotation movement to the linear movement and includes a device for supporting the rack bar 140 toward the pinion gear 120 in a rear surface thereof so as for the rack bar 140 and the pinion gear 120 to be meshed well with each other.

The device for supporting the rack bar 140 includes a support yoke 260, a spring 263, and a yoke plug 265. The support yoke 260 is positioned in a surface opposite to a surface on which the rack gear 110 (refer to FIG. 1) is formed that is a rear surface of the rack bar 140, and is inserted to a cylinder 250 of the gear box 130 to be movable in a front and rear direction that is vertical with respect to the rack bar 140.

The support yoke 260 is shaped like a cylinder so as to slide in a front and rear direction in the cylinder 250 and a front part being in contact with the rack bar 140 includes a groove shaped like a half circle so as to be in close contact with the rear surface of the rack bar 140.

Further, a spring 263 is arranged in a rear area of the support yoke 260 so as for the rack bar 140 and the pinion gear 120 to be in close contact with each other to efficiently transfer power so that it pushes the support yoke 260 with a uniform pressure to compensate for the clearance generated between the rack bar 140 and the pinion gear 120.

Such a support yoke 260 slides relative to and rubs with the rear surface of the rack bar 140 and is made of plastic softer than the conventional rack bar 140 so as to prevent the rack bar 140 from being worn or the generation of noise caused by friction.

The spring 263 received in a spring groove 220 applies pressure so as for the support yoke 260 to come into close contact with the rack bar 140 and uses a general coil spring. The yoke plug 265 is positioned in a rear surface of the spring 263 to support the spring 263.

The yoke plug 265 supports the spring 263 to apply pressure to the support yoke 260. The yoke plug 265 generally includes a screw thread formed with a concave facet to be assembled with the gear box 130 and a lock nut 240 including a screw thread formed with a concave facet. The yoke plug 265 includes a tool groove 230 for inserting a wrench in a rear surface thereof.

If the rack bar is in contact with the support yoke supporting the rack bar to experience certain endurance, the above conventional rack bar supporting device generates the rattle noise due to the clearance caused by the wearing and fails to properly support the rack bar, thereby causing the problem of deterioration of the steering safety.

Further, the displacement of the spring assembled for compensating for the clearance increases as much as the clearance increased during generating the clearance by the wearing of the support yoke so that tension of the spring is deteriorated. As a result, a problem occurs in the structure that if same impulse is applied, noise increases.

DISCLOSURE

Technical Problem

Accordingly, the present invention has been made to solve the above-mentioned problems occurring in the prior art, and the present invention provides a rack bar supporting device of a steering apparatus for a vehicle which can prevent rattle noise generated due to clearance increase caused by the wearing of a rack bar and a support yoke in an endurance driving of a vehicle and maintain a uniform clearance between the rack bar and the support yoke after an endurance driving, thereby transferring stable steering force.

Technical solution

In accordance with an aspect of the present invention, there is provided a rack bar supporting device of a steering apparatus for a vehicle, including:

a support yoke inserted into a cylinder of a gear box to support a rear surface of a rack bar; a clearance compensation elastic body assembled with and supporting a rear surface of the support yoke; a yoke support body having a front surface supporting the clearance compensation elastic body, a fastening boss formed at a center of a rear surface of the yoke support body, the fastening boss having a first spring latching jaw formed by cutting out one side of an outer circumferential surface, and a first guide surface protruding backward from a periphery of a rear surface, the first guide surface being an inclined surface that has a reducing width from an outer circumferential surface to a front surface;

a yoke plug including a second guide surface 351 being in surface contact and assembled with the first guide surface of the yoke support body in a periphery of a front surface of the yoke plug and a spring insertion groove having a decreased diameter at a center of the front surface of the yoke plug, the spring insertion groove having a through hole in a rear surface of the spring insertion groove and a second spring latching jaw formed by cutting out one side in an inner circumferential surface of the spring insertion groove; a torsion spring inserted to an outer circumference of the fastening boss in which one side of the torsion spring is supported by the first spring latching jaw and the other side of the torsion spring is supported by the second spring latching jaw to support the yoke support body in a front direction; and a temporary assembly nut assembled with the fastening boss passing through a through hole of the yoke plug so as to apply torsion to the torsion spring while wide parts of the first guide surface and second guide surface come into close contact with each other.

In accordance with another aspect of the present invention, there is provided a rack bar supporting device of a steering apparatus for a vehicle, including: a support yoke inserted into a cylinder of a gear box to support a rear surface of a rack bar; a clearance compensation elastic body assembled with and supporting a rear surface of the support yoke; a yoke support body having a front surface, the front surface being assembled with and supporting the clearance compensation elastic body; a yoke plug including a spring insertion groove having a decreased diameter at a center of the front surface of the yoke plug and assembled with a rear side of the yoke support body; and an elastic body assembled with and supported by the spring insertion groove to support the yoke support body in a front direction.

In accordance with another aspect of the present invention, there is provided a steering apparatus for a vehicle, including: a steering shaft connected to a steering wheel; a steering column for fixing the steering shaft to a vehicle body; a gear box including a rack gear and a pinion gear converting rotation force received from the steering shaft into a linear movement; a rack bar including the rack gear, both ends of the rack bar being assembled with a tie rod through an inner ball joint; a support yoke inserted into a cylinder of a gear box to support a rear surface of a rack bar; a clearance compensation elastic body assembled with and supporting a rear surface of the support yoke; a yoke support body having a front surface supporting the clearance compensation elastic body, a fastening boss formed at a center of a rear surface of the yoke support body, the fastening boss having a first spring latching jaw formed by cutting out one side of an outer circumferential surface, and a first guide surface protruding backward from a periphery of a rear surface, the first guide surface being an inclined surface that has a reducing width from an outer circumferential surface to a front surface; a yoke plug including a second guide surface 351 being in surface contact and assembled with the first guide surface of the yoke support body in a periphery of a front surface of the yoke plug and a spring insertion groove having a decreased diameter at a center of the front surface of the yoke plug, the spring insertion groove having a through hole in a rear surface of the spring insertion groove and a second spring latching jaw formed by cutting out one side in an inner circumferential surface of the spring insertion groove; a torsion spring inserted to an outer circumference of the fastening boss in which one side of the torsion spring is supported by the first spring latching jaw and the other side of the torsion spring is supported by the second spring latching jaw to support the yoke support body in a front direction; and a temporary assembly nut assembled with the fastening boss passing through a through hole of the yoke plug so as to apply torsion to the torsion spring while wide parts of the first guide surface and second guide surface come into close contact with each other.

Advantageous Effects

Accordingly, the present invention has an effect of preventing rattle noise generated due to clearance increase caused by the wearing of a rack bar and a support yoke in an endurance driving of a vehicle and maintaining a uniform clearance between the rack bar and the support yoke after an endurance driving, thereby transferring stable steering force.

BRIEF DESCRIPTION OF THE DRAWINGS

The above and other aspects, features and advantages of the present invention will be more apparent from the following detailed description taken in conjunction with the accompanying drawings, in which.

BEST MODE

Mode for Invention

Figure 1:
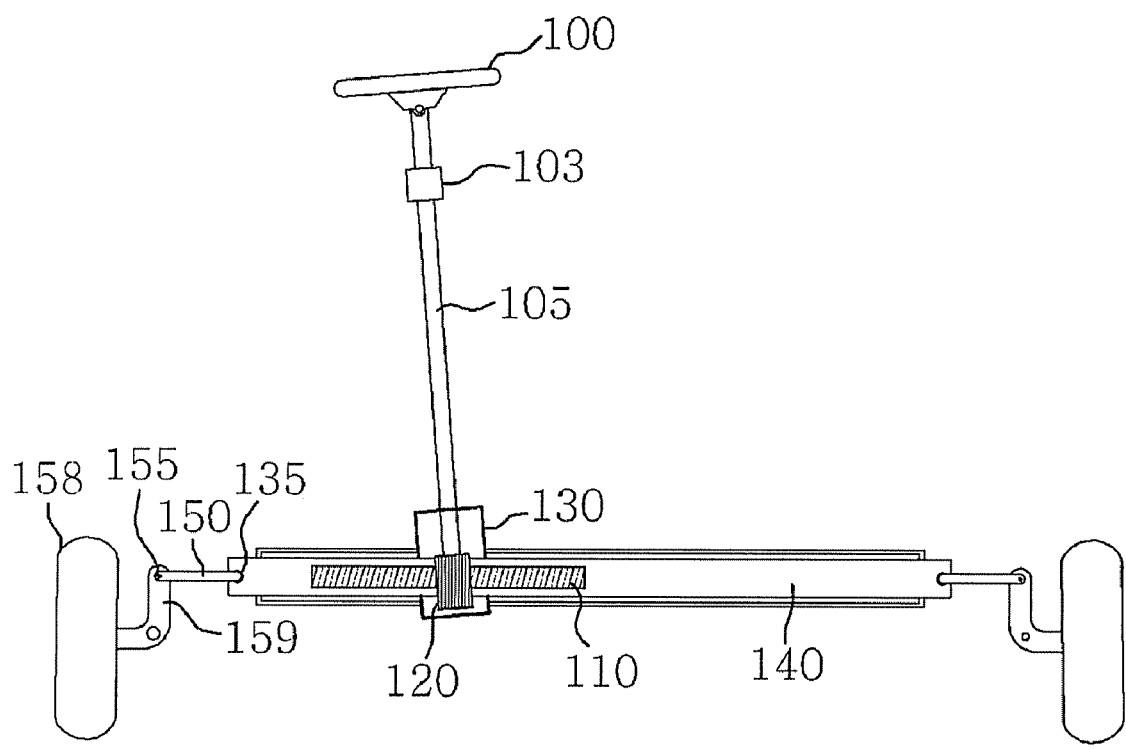
FIG. 1 is a diagram schematically illustrating a general rack pinion-type steering apparatus for a vehicle.
Figure 2:
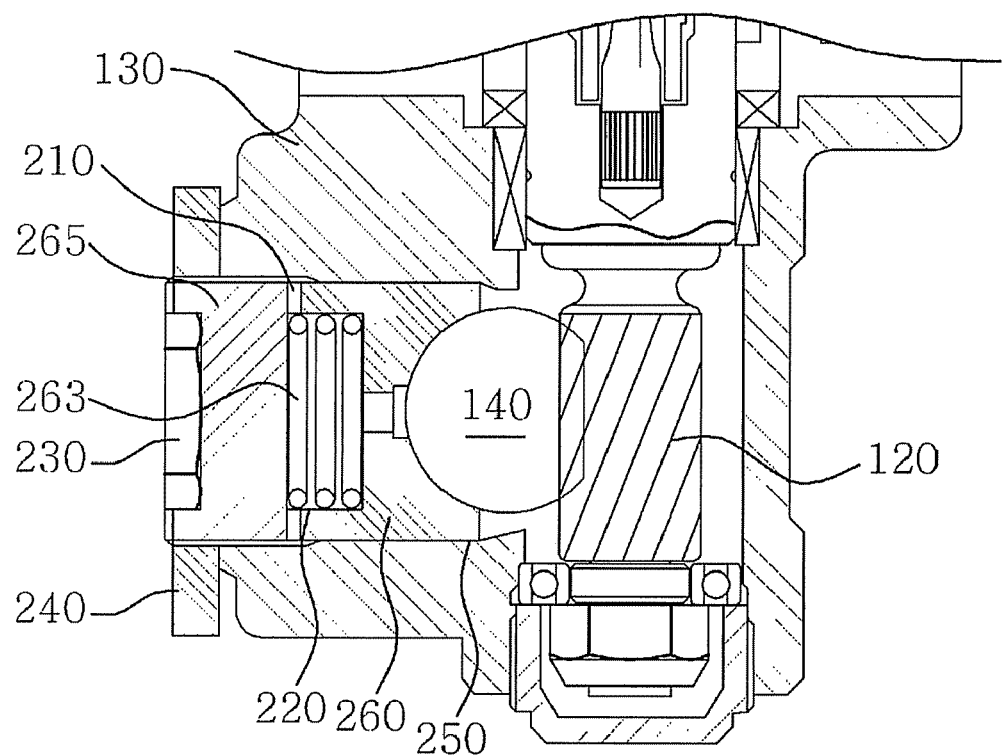
FIG. 2 is a cross-sectional view illustrating a conventional rack bar supporting device.

Hereinafter, exemplary embodiments of the present invention will be described with reference to the accompanying drawings. The construction illustrated in the exemplary embodiments and drawings is merely the preferred embodiments of the present invention, and does not speak for the technical sprit of the present invention. In the following description, the same elements will be designated by the same reference numerals although they are shown in different drawings. Further, in the following description, detailed explanation of known related functions and constitutions may be omitted so as to avoid unnecessarily obscuring the subject manner of the present invention.

Further, in describing the constructional elements of the present invention, the terms of a first, a second, A, B, (a), (b), or the like, can be used. Such a term is only for discriminating the constructional element from another constructional element, and does not limit the essential feature, order, or sequence of the constructional element, or the like. If one constructional element is "coupled to", "assembled with", or "connected to" another constructional element, one constructional element is directly coupled to or connected to another constructional element, but it can be understood as another different constructional element can be "coupled", "assembled", or "connected" between each constructional element.

Figure 3:
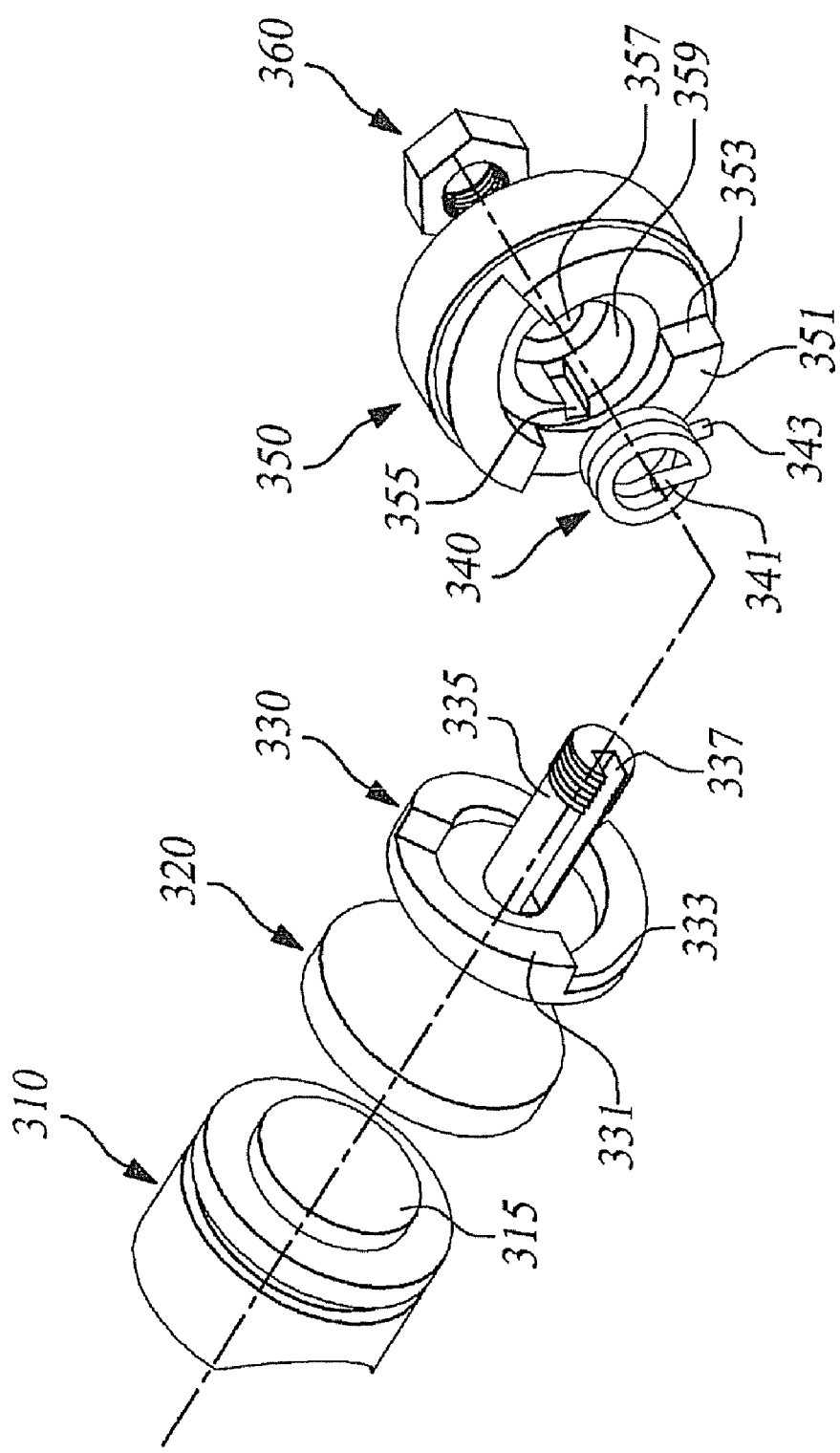
FIG. 3 is an exploded perspective view illustrating a rack bar supporting device according to a first embodiment of the present invention.
Figure 4:
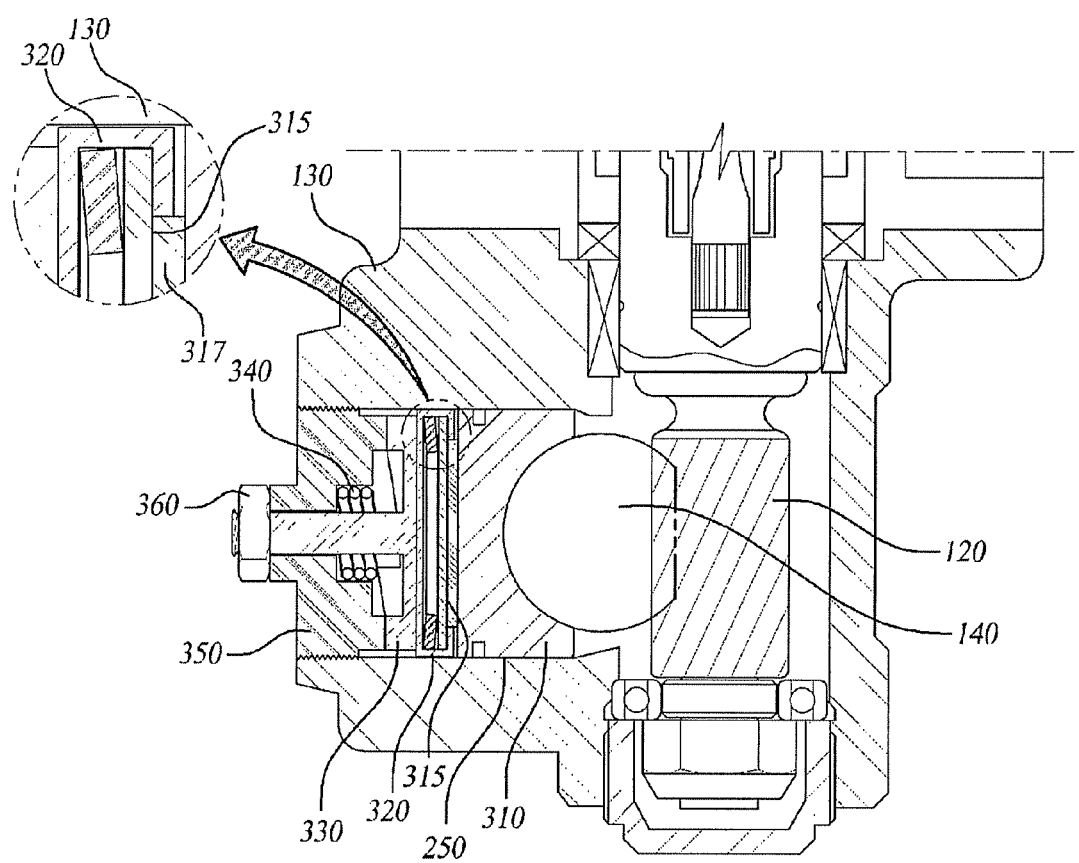
FIG. 4 is a cross-sectional view illustrating a rack bar supporting device according to a first embodiment of the present invention.
Figure 5:
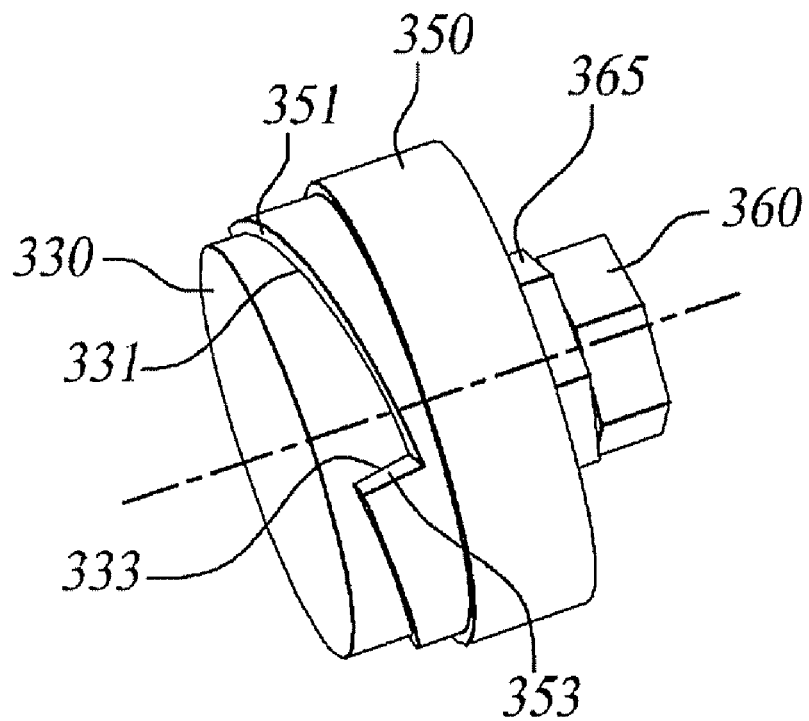
FIG. 5 is a partial assembly view illustrating a rack bar supporting device according to a first embodiment of the present invention.
Figure 6:
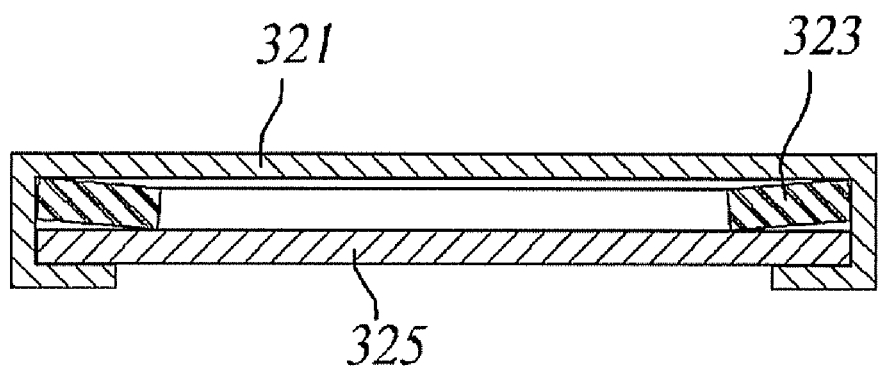
FIG. 6 is a cross-sectional view illustrating a clearance compensation elastic body in a rack bar supporting device according to a first embodiment of the present invention.
Figure 7:
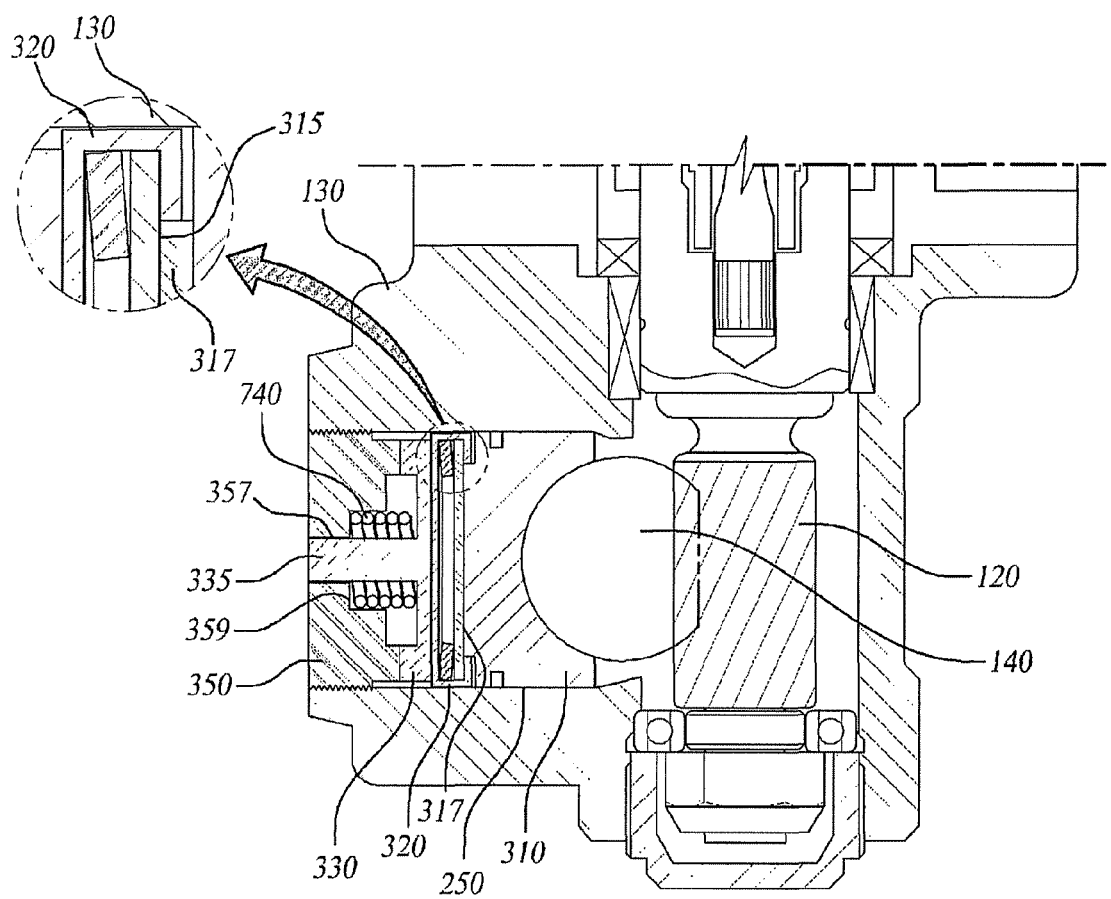
FIG. 7 is a cross-sectional view illustrating a rack bar supporting device according to a second embodiment of the present invention.

FIG. 3 is an exploded perspective view illustrating a rack bar supporting device according to a first embodiment of the present invention, FIG. 4 is a cross-sectional view illustrating a rack bar supporting device according to a first embodiment of the present invention, FIG. 5 is a partial assembly view illustrating a rack bar supporting device according to a first embodiment of the present invention, FIG. 6 is a cross-sectional view illustrating a clearance compensation elastic body in a rack bar supporting device according to a first embodiment of the present invention, and FIG. 7 is a cross-sectional view illustrating a rack bar supporting device according to a second embodiment of the present invention.

As shown in FIGS. 3 to 6, the rack bar supporting apparatus according to the first embodiment of the present invention includes a support yoke 310, a clearance compensation elastic body 320, a yoke support body 330, a yoke plug 350, a torsion spring 340, and a temporary assembly nut 360. The support yoke 310 is inserted into a cylinder 250 of a gear box 130 to support a rear surface of the rack bar. The clearance compensation elastic body 320 is assembled with and supports a rear surface of the support yoke 310. The yoke support body 330 has a front surface supporting the clearance compensation elastic body 320, a fastening boss 335 formed at a center of a rear surface of the yoke support body, the fastening boss having a first spring latching jaw formed by cutting out one side of an outer circumferential surface, and a first guide surface 331 backward protruding from a periphery of the rear surface, the first guide surface being an inclined surface that has a reducing width from an outer circumferential surface to a front surface. The yoke plug 350 includes a second guide surface 351 being in surface contact with the first guide surface 331 of the yoke support body 330 in a periphery of a front surface and a spring insertion bore (groove) 359 having a decreased diameter at a center of the front surface in which a through hole 357 is formed in a rear surface of the spring insertion groove 359 and a second spring latching jaw 355 having one incised side is formed in an inner circumferential surface of the spring insertion groove 359. The torsion spring 340 is inserted to a circumference of the fastening boss 355 so that one side of the torsion spring 340 is supported by the first spring latching jaw 337 and the other side of the torsion spring 340 is supported by the second spring latching jaw 355 to support the yoke support body 330 in a front direction. The temporary assembly nut 360 is assembled with the fastening boss 335 passing through a through hole 357 of the yoke plug 350 so as to apply torsion to the torsion spring 340 while wide parts 333 and 353 of the first guide surface 331 and second guide surface 351 come into close contact with each other.

The support yoke 310 is supported by the yoke plug 350 through the yoke support body 330 and torsion spring 340 in order for the front surface of the support yoke 310 to be in close contact with the rear surface of the rack bar 140 that is meshed with the pinion gear 120 and to be meshed well between the rack bar 140 and the pinion gear 120, in which the front surface of the support yoke 310 supports the rear surface of the rack bar 140. Further, the yoke support body 330 assembled in a rear side of the support yoke 310 pushes the support yoke 310 in a front direction while the first guide surface 331 of the yoke support body 330 moves along the second guide surface 351 of the yoke plug 350 by elastic rotation restoration strength of the torsion spring 340 supported by the yoke plug 350 fixed to the cylinder 250 of the gear box 130.

Such a support yoke 310 slides relative to and rubs with the rear surface of the rack bar 140. Further, the torsion spring 340 is assembled with the first spring latching jaw 337 of the yoke support body 330 and the second spring latching jaw 355 of the support yoke 310 so as to efficiently transfer the power through the close contact of the rack bar 140 with the pinion gear 120 so that the torsion spring 340 elastically deforms and pushes the yoke support body 330 with a predetermined pressure to compensate for the clearance generated between the rack bar 140 and the pinion gear 120.

Further, the clearance compensation elastic body 320 is assembled between the rear surface of the support yoke 310 and the front surface of the yoke support body 330 so as to compensate for the clearance of the support yoke 310 through the elastic deformation.

Here, the clearance compensation elastic body 320 may use a leaf spring, washer, a disc spring, etc., and includes the housing 321 having a cylinder shape and a sealed rear surface so as to come into close contact with the front surface of the yoke support body 330, the elastic support body 323 having a ring shape to be inserted in an inner circumferential surface of the housing 321, a surface of the elastic support body 323 formed by an inside diameter and outer diameter being inclined toward a center axis, and the spacer 325 being in close contact with the support surface 315 of the support yoke 310 and assembled with a bent end of the housing 321 in a front side of the elastic support body 323. Depending on the case, the clearance compensation elastic body 320 may include a connection support body 317 that is inserted between the front surface of the spacer 325 and the bent end of the housing 321 to support the rear surface of the support yoke 310. That is, the connection support body 317 can be configured as an additional component or integrally formed with the rear surface of the support yoke 310 so as to form the support surface 315 while protruding from the rear surface of the support yoke 310.

Further, the elastic support body 323 has modulus lower than that of the torsion spring 340. Therefore, noise and vibration transferred through the rack bar 140 is absorbed in the elastic support body 323 of the clearance compensation elastic body 320 and the clearance generated by wear during the endurance driving is absorbed in the torsion spring 340 to support the yoke support body 330.

When the yoke support body 330 forwardly moves by the elastic rotation restoration strength of the torsion spring 340 in a rear side to support the support yoke 310, the clearance compensation elastic body 320 uniformly compensate for the clearance between the support yoke 310 and the rack bar 140 with the elastic force of the elastic support body 323.

The spacer 325 is coated with a vibration absorbing member so as to prevent noise generated by the contact with the support surface 315 of the support yoke 310 by shock reversely input from the ground during the driving of a vehicle.

The front surface of the yoke support body 330 is assembled with the clearance compensation elastic body 320 while supporting the clearance compensation elastic body 320 and includes the fastening boss 335 in a center of the rear surface in which the fastening boss is formed with the first spring latching jaw 337 having one incised side of the outer circumferential surface.

The yoke support body 330 includes the first guide surface 331 that protrudes from a periphery of the rear surface in a rear direction and is inclined having a reducing width from an outer circumferential surface to a front surface, so that the first guide surface 33 of the yoke support body 330 is in surface contact and assembled with the second guide surface 351 of the yoke plug 350 described later.

The first guide surface 331 shaped like a spiral is formed on an outer circumferential surface of the yoke support body 330 and is formed with a spiral inclined surface in which the first guide surface 331 has the decreasing width from an end of the rear side of the outer circumferential surface, i.e. the first wide part 333 having the widest width of the outer circumferential surface, to the front surface.

The second guide surface 351 has the identical shape to the first guide surface 331 that is in surface contact with the second guide surface 351, and has a spiral inclined surface in which the first guide surface 331 has the decreasing width from an end of the front side of the outer circumferential surface of the yoke plug 350, i.e. the second wide part 353, to the rear surface.

Therefore, the first guide surface 331 rotates and slides along the second guide surface 351 to move in the front side at the end.

In the meantime, the yoke plug 350 supports the torsion spring 340 and is assembled with the cylinder 250 of the gear box 130 while applying pressure to the yoke support body 330. The yoke plug 350 includes the screw thread formed with the concave facet in the outer circumferential surface thereof to be screw assembled with the gear box 130 including a screw thread formed with a concave facet that is meshed with the screw thread formed with the concave facet of the yoke plug 350.

The yoke plug 350 includes the second guide surface 351 coming into surface contact and assembled with the first guide surface 331 of the yoke support body 330 in the outer circumferential part of the front surface and the spring insertion groove 359 having a decreased diameter in a center of the front surface.

The spring insertion groove 359 includes the through hole 357 in the rear surface and the second spring latching jaw 355 having one incised side in the inner circumferential surface so that the torsion spring 340 is set in the spring insertion groove 359 to be assembled.

Further, the yoke plug 350 includes a tool assembly part 365 protruding from the rear surface in a rear direction to be inserted into a fastening tool to make the assembly of the yoke plug 350 easy.

The torsion spring 340 is inserted to the outer circumference of the fastening boss 335 to be set in the spring insertion groove 359 in which a first support part 341 formed at the end of the front side is supported by the first spring latching jaw 337 of the yoke support body 330 and a second support part 343 formed at the end of the rear side is supported by the second spring latching jaw 355 to be assembled.

The yoke support body 330 and the yoke plug 350 among the rack bar 140 supporting device are assembled by the temporary assembly nut 360 so as to generate torsion force to the torsion spring that is assembled in the inner side of the yoke support body 330 and yoke plug 350.

The fastening boss 335 of the yoke support body 330 is fitted to the temporary assembly nut 360 in which a screw part is formed in the outer circumferential surface of the fastening boss 335 to pass through the through hole 357 of the yoke plug 350 so that the fastening boss 335 is screw assembled with the temporary assembly nut 360.

That is, in a free state of not generating the torsion force to the torsion spring 340, the first support part 341 and second support part 343 of the torsion spring 340 are inserted into the first spring latching jaw 337 and second spring latching jaw 355, respectively, and in a state of passing the fastening boss 355 of the yoke support body 330 through the through hole 357 of the yoke plug 350, the first guide surface 331 is in contact with the second guide surface 351 to rotate them through applying the torsion force to the torsion spring 340 so that the fastening boss 335 is fastened with the rear side of the yoke plug 350 through the temporary assembly nut 360 at the time of the first wide part 333 of the first guide surface 331 being in contact with the second wide part 353 of the second guide surface 351.

The elastic rotation restoration strength of the torsion spring 340 is offset by the fastening strength of the temporary assembly nut 360 so that the yoke support body 330 and yoke plug 350 fastened by the temporary assembly nut 360 are inserted to the cylinder 250 of the gear box 130 to be fastened in a contact state of the first wide part 333 and the second wide part 353.

If the temporary assembly nut 360 is released and removed from the state fastened to the cylinder 250 of the gear box 130, the elastic rotation restoration strength of the torsion spring 340 is generated from this time so that the first guide surface 331 of the yoke support body 330 rotates along the second guide surface 351 of the yoke plug 350 to forwardly move, thereby supporting the clearance compensation elastic body 320 or the support yoke 310.

In the meantime, as shown in FIG. 7, the rack bar supporting device for the vehicle according to the second embodiment of the present invention includes the support yoke inserted into the cylinder 250 of the gear box 130 to support the rear surface of the rack bar 140, the clearance compensation elastic body 320 assembled with and supports the rear surface of the support yoke 310, the yoke plug 350 including the spring insertion groove 359 with a decreased diameter at a center of the front surface and assembled with the rear side of the yoke support body 330, and an elastic body 740 assembled with and supported by the spring insertion groove 359 to support the yoke support body 330 in a front direction.

Further, the yoke support body 330 includes the fastening boss 335 at the center of the rear surface of the yoke support body 330 and the yoke plug 350 includes the through hole 357 through which the fastening boss 335 passes in the rear surface of the spring insertion groove 359. Therefore, when the elastic body 740 supports the yoke support body 330 in a front direction, the fastening boss 335 is assembled with and supported by the through hole 357.

Further, the clearance compensation elastic body 320 may use a leaf spring, washer, a disc spring, etc., and includes the housing 321 having a cylinder shape and a sealed rear surface so as to come into close contact with the front surface of the yoke support body 330, the elastic support body 323 having a ring shape to be inserted in an inner circumferential surface of the housing 321, a surface of the elastic support body 323 formed by an inside diameter and outer diameter being inclined toward a center axis, and the spacer 325 being in close contact with the support surface 315 of the support yoke 310 and assembled with a bent end of the housing 321 in a front side of the elastic support body 323. Depending on the case, the clearance compensation elastic body 320 may include the connection support body 317 that is inserted between the front surface of the spacer 325 and the bent end of the housing 321 to support the rear surface of the support yoke 310.

Such a connection support body 317 can be configured as an additional component or integrally formed with the rear surface of the support yoke 310 so as to form the support surface 315 while protruding from the rear surface of the support yoke 310. That is, the clearance compensation elastic body 320 according to the second embodiment of the present invention can support the rear surface of the support yoke 310 through the connection support body 317, in which the connection support body 317 is in close contact and assembled with the spacer 325 in a front side of the clearance compensation elastic body 320 and can be integrally formed with the support yoke 310 as shown in the first embodiment of the present invention.

The yoke support body 330 supporting the clearance compensation elastic body 320 in a direction of the support yoke 310 includes the fastening boss 335 at the center of the rear surface of the yoke support body 330, the yoke plug 350 includes the spring insertion groove 359 having a decreased diameter at a center of the front surface, and the spring insertion groove 359 includes the through hole 357 through which the fastening boss 335 passes in the rear surface so that the elastic body 740 assembled with and supported by the outer circumferential surface of the fastening boss 335 and the spring insertion groove 359 supports the yoke support body 330 toward the front side where the clearance compensation elastic body 320 is located.

Here, the elastic body 740 can use a general compressed coil spring or a cylinder-shaped spring made of an elastic material and the elastic strength of the elastic body 740 is greater than that of the clearance compensation elastic body 320. Therefore, the noise and vibration transferred through the rack bar 140 is absorbed in the clearance compensation elastic body 320 and the clearance generated by wear during the endurance driving is absorbed in the elastic body 740.

In the meantime, with reference to the steering apparatus for the vehicle shown in FIG. 1, the rack bar supporting device for the vehicle according to the first and second embodiments of the present invention is assembled with the steering shaft connected to the steering wheel 105, the steering column for fixing the steering shaft to the vehicle body, the gear box 130 including the rack gear and pinion gear converting the rotation force received from the steering shaft into the linear movement, the rack bar 140 including the rack gera, both ends of the rack bar 140 being assembled with the tie rod through the inner ball joint, etc., to construct the steering apparatus for the vehicle according to the third embodiment of the present invention.

According to the present invention having the aforementioned structure and shape, it is possible to prevent rattle noise generated due to clearance increase caused by the wearing of a rack bar and a support yoke in an endurance driving of a vehicle and maintain a uniform clearance between the rack bar and the support yoke after an endurance driving, thereby transferring stable steering force.

In the above description, even though it is described that all of the constructional elements are assembled into one part or are assembled with each other to operate, the present invention is not definitely limited to the embodiment. That is, within the purpose scope of the present invention, at least one among the constructional elements is selectively assembled to operate.

Further, the terms, 'include, 'construct', or 'have' represented above mean that the corresponding constructional element may be included, only if there is no counter description. Therefore, this shall be interpreted to further include another constructional element, not to exclude another constructional element. Every term including a technical or scientific term has an identical meaning to that it can be generally understood by those skilled in the art, as long as there is no counter description. The general used terms like terms defined in a dictionary must be interpreted to correspond to the contextual meaning in the related technology and should not be interpreted as the ideal or excessively formal meaning, only if the term is not explicitly defined in the present invention.

The foregoing is merely an exemplary embodiment of the technical sprit of the present invention and it will be readily understood by those skilled in the art that various modifications and changes can be made thereto within the technical spirit and scope of the present invention. Thus, the exemplary embodiment disclosed in the present invention is not for limiting the technical sprit, but for describing it, and the present invention is not limited thereto. The protection scope of the present invention shall be interpreted by the appended claims and every technical sprit within its equivalent scope shall be understood to be included in the claims of the present invention.

The invention claimed is:

1. A rack bar supporting device of a steering apparatus for a vehicle, comprising:
   a support yoke inserted into a cylinder of a gear box to support a rear surface of a rack bar;
   a clearance compensation elastic body assembled with and supporting a rear surface of the support yoke;
   a yoke support body having
      a front surface supporting the clearance compensation elastic body,
      a fastening boss disposed at a center of a rear surface of the yoke support body, the fastening boss having a first spring latching jaw comprising a recess extending radially from one side of an outer circumferential surface of the fastening boss, and
      a first guide surface protruding backward from a periphery of a rear surface of the yoke support body, the first guide surface being an inclined surface that has a reducing width from an outer circumferential surface of the yoke support body to a front surface of the yoke support body;
   a yoke plug comprising
      a second guide surface, being in surface contact and assembled with the first guide surface of the yoke support body in a periphery of a front surface of the yoke plug, and
      a spring insertion bore having a decreased diameter at a center of the front surface of the yoke plug, the spring insertion bore having a through hole in a rear surface of the spring insertion bore and a second spring latching jaw comprising a recess extending radially from an inner circumferential surface of the spring insertion bore;
   a torsion spring inserted to an outer circumference of the fastening boss in which one side of the torsion spring is supported by the first spring latching jaw and the other side of the torsion spring is supported by the second spring latching jaw to support the yoke support body in a front direction; and
   a temporary assembly nut assembled with the fastening boss passing through the through hole of the spring insertion bore of the yoke plug so as to apply torsion to the torsion spring while wide parts of the first guide surface and second guide surface come into close contact with each other.

2. The rack bar supporting device of the steering apparatus for the vehicle as claimed in claim 1, wherein the support yoke has a support surface protruding from a rear surface of the support yoke in a rear direction, and the clearance compensation elastic body comprises:

a housing having a cylinder shape and a sealed rear surface to be assembled with and support the support yoke;

an elastic support body inserted in an internal circumferential surface of the housing; and a spacer being in close contact with the support surface of the support yoke in front of the elastic support body and assembled with a bent end of the housing.

3. The rack bar supporting device of the steering apparatus for the vehicle as claimed in claim 2, wherein the elastic support body is shaped like a ring inserted in an inner circumferential surface of the housing and has a surface formed by an external diameter and inner diameter, which is inclined toward a center axis.

4. The rack bar supporting device of the steering apparatus for the vehicle as claimed in claim 2, wherein the elastic support body has modulus lower than modulus of the torsion spring.

5. The rack bar supporting device of the steering apparatus for the vehicle as claimed in claim 2, wherein the spacer is coated with a vibration absorbing member so as to prevent noise generated by the contact with the support surface of the support yoke.

6. The rack bar supporting device of the steering apparatus for the vehicle as claimed in claim 1, wherein the clearance compensation elastic body comprises:

a housing having a cylinder shape and a sealed rear surface to be assembled with and support the support yoke;

an elastic support body inserted in an internal circumferential surface of the housing;

a spacer assembled with a bent end of the housing in front of the elastic support body; and a connection support body inserted between a front surface of the spacer and the bent end of the housing to support the rear surface of the support yoke.

7. The rack bar supporting device of the steering apparatus for the vehicle as claimed in claim 1, wherein the fastening boss of the yoke support body comprises a screw part in the outer circumferential surface thereof to pass through the yoke plug and be assembled with the temporary assembly nut.

8. The rack bar supporting device of the steering apparatus for the vehicle as claimed in claim 1, wherein the yoke plug comprises a tool assembly part protruding from a rear surface of the yoke plug in a rear direction to be inserted into a fastening tool.

9. The rack bar supporting device of the steering apparatus for the vehicle as claimed in claim 1, wherein the clearance compensation elastic body is disposed on a central portion of the rear surface of the support yoke.

10. The rack bar supporting device of the steering apparatus for the vehicle as claimed in claim 1, wherein the first spring latching jaw extends substantially in parallel with an axis of the gear box.

11. The rack bar supporting device of the steering apparatus for the vehicle as claimed in claim 1, wherein the second spring latching jaw extends substantially in parallel with the axis of the gear box.

12. A steering apparatus for a vehicle, comprising:

a steering shaft connected to a steering wheel;

a steering column for fixing the steering shaft to a vehicle body;

a gear box having the shape of a cylinder and comprising a rack gear and a pinion gear converting rotation force received from the steering shaft into a linear movement;

a rack bar including the rack gear, both ends of the rack bar being assembled with a tie rod through an inner ball joint;

a support yoke inserted into the cylinder of the gear box to support a rear surface of a rack bar;

a clearance compensation elastic body assembled with and supporting a rear surface of the support yoke;

a yoke support body having a front surface supporting the clearance compensation elastic body, a fastening boss disposed at a center of a rear surface of the yoke support body, the fastening boss having a first spring latching jaw comprising a recess extending radially from one side of an outer circumferential surface of the fastening boss, and a first guide surface protruding backward from a periphery of a rear surface of the yoke support body, the first guide surface being an inclined surface that has a reducing width from an outer circumferential surface of the yoke support body to a front surface of the yoke support body;

a yoke plug comprising a second guide surface, being in surface contact and assembled with the first guide surface of the yoke support body in a periphery of a front surface of the yoke plug, and a spring insertion bore having a decreased diameter at a center of the front surface of the yoke plug, the spring insertion bore having a through hole in a rear surface of the spring insertion bore and a second spring latching jaw comprising a recess extending radially from an inner circumferential surface of the spring insertion bore;

a torsion spring inserted into an outer circumference of the fastening boss in which one side of the torsion spring is supported by the first spring latching jaw and the other side of the torsion spring is supported by the second spring latching jaw to support the yoke support body in a front direction; and a temporary assembly nut assembled with the fastening boss passing through the through hole of the spring insertion bore of the yoke plug so as to apply torsion to the torsion spring while wide parts of the first guide surface and second guide surface come into close contact with each other.

13. The steering apparatus for the vehicle as claimed in claim 12, wherein the support yoke has a support surface protruding from a rear surface of the support yoke in a rear direction, and the clearance compensation elastic body comprises:

a housing having a cylinder shape and a sealed rear surface to be assembled with and support the support yoke;

an elastic support body inserted in an internal circumferential surface of the housing; and a spacer being in close contact with the support surface of the support yoke in front of the elastic support body and assembled with a bent end of the housing.

14. The steering apparatus for the vehicle as claimed in claim 13, wherein the elastic support body is shaped like a ring inserted in an inner circumferential surface of the housing and has a surface formed by an external diameter and inner diameter, which is inclined toward a center axis.

15. The steering apparatus for the vehicle as claimed in claim 13, wherein the elastic support body has modulus lower than modulus of the torsion spring.

16. The steering apparatus for the vehicle as claimed in claim 12, wherein the clearance compensation elastic body comprises:
- a housing having a cylinder shape and a sealed rear surface to be assembled with and support the support yoke;
- an elastic support body inserted in an internal circumferential surface of the housing;
- a spacer assembled with a bent end of the housing in front of the elastic support body; and
- a connection support body inserted between a front surface of the spacer and the bent end of the housing to support the rear surface of the support yoke.

17. The steering apparatus for the vehicle as claimed in claim 12, wherein the clearance compensation elastic body is disposed on a central portion of the rear surface of the support yoke.

18. The steering apparatus for the vehicle as claimed in claim 12, wherein the first spring latching jaw extends substantially in parallel with an axis of the gear box.

19. The steering apparatus for the vehicle as claimed in claim 12, wherein the second spring latching jaw extends substantially in parallel with an axis of the gear box.

* * * * *